(12) United States Patent
Sabouri et al.

(10) Patent No.: US 8,995,505 B2
(45) Date of Patent: Mar. 31, 2015

(54) SLIDING IF TRANSCEIVER ARCHITECTURE

(71) Applicant: QUALCOMM Incorporated, San Diego, CA (US)

(72) Inventors: Faramarz Sabouri, San Diego, CA (US); Alberto Cicalini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 28 days.

(21) Appl. No.: 13/691,238

(22) Filed: Nov. 30, 2012

(65) Prior Publication Data

US 2014/0153616 A1  Jun. 5, 2014

(51) Int. Cl.
  *H04B 1/38* (2006.01)
  *H04B 1/40* (2006.01)
(52) U.S. Cl.
  CPC . *H04B 1/40* (2013.01); *H04B 1/403* (2013.01)
  USPC ........... 375/219; 455/86; 455/196.1; 455/209
(58) Field of Classification Search
  CPC combination set(s) only.
  See application file for complete search history.

(56) References Cited

U.S. PATENT DOCUMENTS

| 7,508,898 B2 * | 3/2009 | Cyr et al. ........................ 375/376 |
| 7,590,205 B2 | 9/2009 | Zipper |
| 8,078,100 B2 | 12/2011 | Proctor, Jr. et al. |
| 2004/0204036 A1 * | 10/2004 | Yang ........................... 455/553.1 |
| 2006/0195883 A1 * | 8/2006 | Proctor et al. ................. 725/127 |
| 2009/0298433 A1 | 12/2009 | Sorrells et al. |
| 2010/0093302 A1 * | 4/2010 | Abe et al. ....................... 455/325 |
| 2010/0167685 A1 | 7/2010 | Burke et al. |

FOREIGN PATENT DOCUMENTS

| EP | 0678974 A2 | 10/1995 |
| WO | 2006021940 A2 | 3/2006 |

OTHER PUBLICATIONS

International Search Report and Written Opinion—PCT/US2013/072348, International Search Authority—European Patent Office, Mar. 17, 2014.
Muhammad K., et al., "The First Fully Integrated Quad-Band GSM/GPRS Receiver in a 90-nm Digital CMOS Process", IEEE Journal of Solid-State Circuits, vol. 41, No. 8, Aug. 1, 2006 , pp. 1772-1783, XP055105982, ISSN: 0018-9200, DOI: 10.1109/JSSC.2006.877271.
Staszewski R.B., et al., digitally-assisted RF (in 11 Digital RF and vited) . . . , Radio-Frequency Integration Technology (RFIT),2011 IEEE International Symposium On, IEEE, Nov. 30, 2011 pp. 9-16, XP032103861, DOI: 10.1109/RFIT.2011.6141746 ISBN: 978-1-4577-0517-5.

* cited by examiner

*Primary Examiner* — Adolf Dsouza
(74) *Attorney, Agent, or Firm* — Ramin Mobarhan (57) ABSTRACT

Techniques for providing a transceiver with a sliding intermediate frequency (IF). In an aspect, a PLL generates a single local oscillator (LO) signal used for both up-conversion by a transmit (TX) signal path and down-conversion by a receive (RX) signal path, wherein the LO frequency is chosen as the TX carrier frequency. As the TX and RX carrier frequencies may generally differ by a variable amount, the RX signal path utilizing the (TX) LO frequency for down-conversion may be characterized as having a "sliding" IF. To accommodate the sliding IF receiver architecture, specific processing functions such as charge sampling, discrete-time analog band-pass filtering, and sub-sampling analog-to-digital conversion (ADC) are described.

17 Claims, 10 Drawing Sheets

FIG 9

SLIDING IF TRANSCEIVER ARCHITECTURE

BACKGROUND

1. Field

The disclosure relates to transceiver architectures for communications systems.

2. Background

Wireless transceivers incorporate circuitry for performing both transmit (TX) and receive (RX) functions for a communications apparatus. The TX portion of a transceiver may include a baseband TX signal generator and up-conversion mixers for mixing the baseband TX signal with a TX local oscillator (LO), which shifts the TX signal up to the TX carrier frequency. The RX portion of the transceiver may include down-conversion mixers for mixing an RX signal with an RX LO, which shifts the spectrum of the RX signal down in frequency for further processing.

As the TX and RX carrier frequencies may generally be different based on the communications system design, zero-intermediate frequency (zero-IF) transceiver architectures typically employ separate TX and RX LO's (i.e., at different frequencies) to perform the up-conversion and down-conversion, respectively. However, the need to provide separate TX and RX LO's undesirably increases the power and die area consumption of the transceiver, e.g., due to the need to provide multiple phase-locked loops (PLL's) to generate the separate TX and RX LO's. On the other hand, providing a single LO for both TX and RX portions of a transceiver (e.g., according to a non-ZIF architecture) poses several challenges, as the resultant intermediate frequency (IF) of the RX signal would be variable, depending on the particular communication system design.

It would be desirable to provide techniques to accommodate such a variable or "sliding" IF to advantageously reduce power consumption and complexity in transceiver designs.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The detailed description set forth below in connection with the appended drawings is intended as a description of exemplary aspects of the invention and is not intended to represent the only exemplary aspects in which the invention can be practiced. The term "exemplary" used throughout this description means "serving as an example, instance, or illustration," and should not necessarily be construed as preferred or advantageous over other exemplary aspects. The detailed description includes specific details for the purpose of providing a thorough understanding of the exemplary aspects of the invention. It will be apparent to those skilled in the art that the exemplary aspects of the invention may be practiced without these specific details. In some instances, well-known structures and devices are shown in block diagram form in order to avoid obscuring the novelty of the exemplary aspects presented herein. In this specification and in the claims, the terms "module" and "block" may be used interchangeably to denote an entity configured to perform the operations described.

Figure 1:
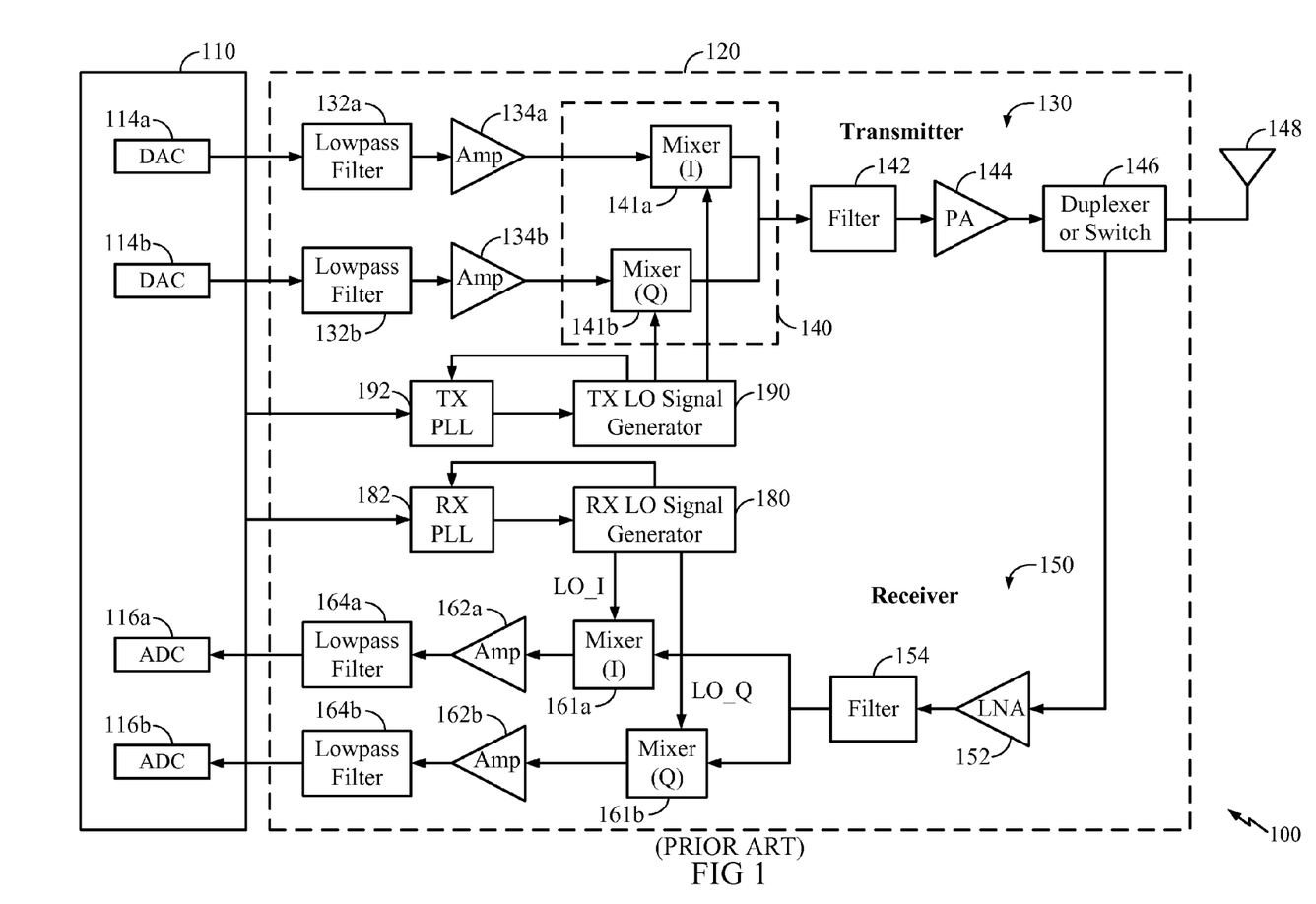
FIG. 1 illustrates a block diagram of a design of a prior art wireless communication device in which the techniques of the present disclosure may be implemented.

FIG. 1 illustrates a block diagram of a design of a prior art wireless communication device 100 in which the techniques of the present disclosure may be implemented. FIG. 1 shows an example transceiver design. In general, the conditioning of the signals in a transmitter and a receiver may be performed by one or more stages of amplifier, filter, upconverter, down-converter, etc. These circuit blocks may be arranged differently from the configuration shown in FIG. 1. Furthermore, other circuit blocks not shown in FIG. 1 may also be used to condition the signals in the transmitter and receiver. Unless otherwise noted, any signal in FIG. 1, or any other figure in the drawings, may be either single-ended or differential. Some circuit blocks in FIG. 1 may also be omitted.

In the design shown in FIG. 1, wireless device 100 includes a transceiver 120 and a data processor 110. The data processor 110 may include a memory (not shown) to store data and program codes. Transceiver 120 includes a transmitter 130 and a receiver 150 that support bi-directional communication. In general, wireless device 100 may include any number of transmitters and/or receivers for any number of communication systems and frequency bands. All or a portion of transceiver 120 may be implemented on one or more analog integrated circuits (ICs), RF ICs (RFICs), mixed-signal ICs, etc.

A transmitter or a receiver may be implemented with a super-heterodyne architecture or a direct-conversion architecture. In the super-heterodyne architecture, a signal is frequency-converted between radio frequency (RF) and baseband in multiple stages, e.g., from RF to an intermediate frequency (IF) in one stage, and then from IF to baseband in another stage for a receiver. In the direct-conversion architecture, a signal is frequency converted between RF and baseband in one stage. The super-heterodyne and direct-conversion architectures may use different circuit blocks and/or have different requirements. In the design shown in FIG. 1, transmitter 130 and receiver 150 are implemented with the direct-conversion architecture.

In the transmit path, data processor 110 processes data to be transmitted and provides I and Q analog output signals to transmitter 130. In the exemplary embodiment shown, the data processor 110 includes digital-to-analog-converters (DAC's) 114a and 114b for converting digital signals generated by the data processor 110 into the I and Q analog output signals, e.g., I and Q output currents, for further processing.

Within transmitter 130, lowpass filters 132a and 132b filter the I and Q analog output signals, respectively, to remove undesired images caused by the prior digital-to-analog conversion. Amplifiers (Amp) 134a and 134b amplify the signals from lowpass filters 132a and 132b, respectively, and provide I and Q baseband signals. An upconverter 140 upconverts the I and Q baseband signals with I and Q transmit (TX) local oscillator (LO) signals from a TX LO signal generator 190 and provides an upconverted signal. A filter 142 filters the upconverted signal to remove undesired images caused by the frequency upconversion as well as noise in a receive frequency band. A power amplifier (PA) 144 amplifies the signal from filter 142 to obtain the desired output power level and provides a transmit RF signal. The transmit RF signal is routed through a duplexer or switch 146 and transmitted via an antenna 148.

In the receive path, antenna 148 receives signals transmitted by base stations and provides a received RF signal, which is routed through duplexer or switch 146 and provided to a low noise amplifier (LNA) 152. The duplexer 146 is designed to operate with a specific RX-to-TX duplexer frequency separation, such that RX signals are isolated from TX signals. The received RF signal is amplified by LNA 152 and filtered by a filter 154 to obtain a desired RF input signal. Downconversion mixers 161a and 161b mix the output of filter 154 with I and Q receive (RX) LO signals (i.e., LO_I and LO_Q) from an RX LO signal generator 180 to generate I and Q baseband signals. The I and Q baseband signals are amplified by amplifiers 162a and 162b and further filtered by lowpass filters 164a and 164b to obtain I and Q analog input signals, which are provided to data processor 110. In the exemplary embodiment shown, the data processor 110 includes analog-to-digital-converters (ADC's) 116a and 116b for converting the analog input signals into digital signals to be further processed by the data processor 110.

In FIG. 1, TX LO signal generator 190 generates the I and Q TX LO signals used for frequency upconversion, while RX LO signal generator 180 generates the I and Q RX LO signals used for frequency downconversion. Each LO signal is a periodic signal with a particular fundamental frequency. A PLL 192 receives timing information from data processor 110 and generates a control signal used to adjust the frequency and/or phase of the TX LO signals from LO signal generator 190. Similarly, a PLL 182 receives timing information from data processor 110 and generates a control signal used to adjust the frequency and/or phase of the RX LO signals from LO signal generator 180.

In the transceiver 120, note the TX LO signal generator 190 and the RX LO signal generator 180 are provided separately, as the TX and RX carrier frequencies in the communication system are generally different from each other by design. For example, the TX carrier frequency may lie in a TX band of 1920-1980 MHz, while the RX carrier frequency may lie in an RX band of 2110-2170 MHz. The need to provide a TX LO signal generator 190 separate from an RX LO signal generator 180 generally calls for two PLL's (TX PLL 192 and RX PLL 182) operating simultaneously in the transceiver 120, which is more complex and undesirably consumes more power and more die area than if only one PLL were used. Furthermore, providing two PLL's may potentially cause voltage-controlled oscillator (VCO) "pulling," particularly in carrier aggregation scenarios wherein two VCO's run at frequencies very close to each other. In light of these considerations, it would be desirable to provide techniques for reducing power and die area in transceivers, as well as improving their performance.

Figure 2:
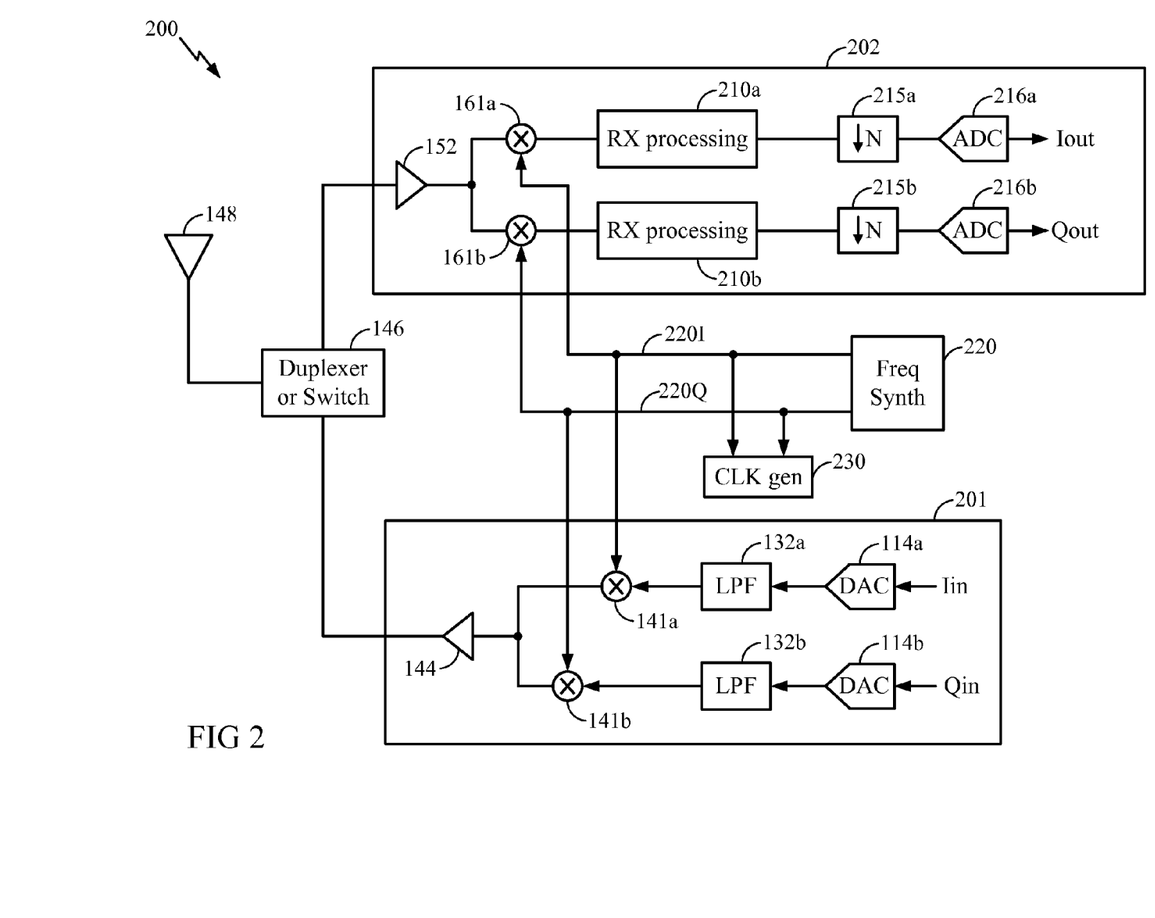
FIG. 2 illustrates an exemplary embodiment of a transceiver according to the present disclosure.

FIG. 2 illustrates an exemplary embodiment 200 of a transceiver according to the present disclosure. Note FIG. 2 is shown for illustrative purposes only, and is not meant to limit the scope of the present disclosure. Further note that similarly labeled elements in FIGS. 1 and 2 may correspond to elements having similar functionality, and thus the descriptions for certain elements in FIG. 2 already described with reference to FIG. 1 are omitted for convenience. The transceiver 200 includes a transmit signal path 201 and a receive signal path 202.

The transmit (TX) signal path 201 includes DAC's 114a, 114b coupled to low-pass filters (LPF's) 132a, 132b, further coupled to mixers 141a, 141b. In the exemplary embodiment shown, mixers 141a, 141b mix the LPF output signals with TX LO signals, e.g., in-phase and quadrature local oscillator (LO) signals 220I and 220Q, respectively, generated by a frequency synthesizer 220. Note in this specification and in the claims, the term "a local oscillator signal" may generally refer to either of signals 220I or 220Q, or collectively to both in-phase and quadrature signals 220I and 220Q having a single frequency.

In an exemplary embodiment, signals 220I, 220Q may have a frequency of f_TX, corresponding to the center frequency of the transmit signal. In alternative exemplary embodiments, the frequency of signals 220I, 220Q need not be restricted to f_TX, and may instead be chosen to be any other suitable frequency. Following the mixers 141a, 141b, the upconverted signals are combined and provided to the power amplifier (PA) 144.

The receive (RX) signal path 202 includes the LNA 152, which amplifies a receive (RX) signal having a center frequency f_RX. The output of LNA 152 is coupled to the I mixer 161a and the Q mixer 161b, which mix the LNA output with the same LO signals 220I and 220Q used for upconversion by the transmit signal path 201 to downconvert the outputs of mixers 161a, 161b. As LO's 220I, 220Q have frequency f_TX, following downconversion the RX signal will be centered at an intermediate frequency (IF) of f_RX-f_TX (or f_TX-f_RX). As the difference between f_TX and f_RX may be variable across different communications systems and operating scenarios, the exemplary embodiment of FIG. 2 may be characterized as having a "sliding IF." For example, in an exemplary embodiment, the IF may vary over as much as one decade of frequency range, depending on the relationship between f_TX and f_RX for a given communications system.

Note in this specification and in the claims, the "TX local oscillator signal" may refer to the LO signal provided to the TX mixers 141a, 141b of the TX signal path 201, while the "RX local oscillator signal" may refer to the LO signal provided to the RX mixers 161a, 161b of the RX signal path 202. Note the TX local oscillator signal and the RX local oscillator signal need not be separate signals, e.g., as is shown in FIG. 2 wherein the TX and RX LO signals corresponds to 220I, 220Q generated by the frequency synthesizer 220.

Following down-conversion, RX processing blocks 210a, 210b are provided to process the sliding-IF outputs of mixers 161a, 161b. In an exemplary embodiment, RX processing blocks 210a, 210b may process the sliding-IF signals using, e.g., filtering, sampling, etc., as further described hereinbelow with reference to FIG. 3, to remove interference and other noise components from the sliding-IF signals for subsequent processing. According to the present disclosure, blocks 210a, 210b may include discrete-time analog filters, e.g., discrete-time analog bandpass filters, having configurable frequency characteristics to band-pass filter the sliding-IF RX signals. The band-pass filters may be configured to remove interference at image and aliasing frequencies. The outputs of RX processing blocks 210a, 210b are coupled to downsampling blocks 215a, 215b, followed by ADC's 216a, 216b for digitization.

In an exemplary embodiment, the ADC's 216a, 216b may be "band-pass" ADC's designed to optimally digitize signals having a bandpass nature. For example, ADC's 216a, 216b may sub-sample the input signal, i.e., sample the input signal at a rate less than the Nyquist frequency of the input signal. In an exemplary embodiment, the sub-sampling may be implemented by downsampling the input signal by a factor of N using blocks 215a, 215b, prior to digitization. Note in certain exemplary embodiments, the ADC's 216a, 216b need not perform sub-sampling, and accordingly, the down-sampling blocks 215a, 215b may be omitted in such exemplary embodiments. In an exemplary embodiment, an ADC sampling clock may be derived from either or both of the LO's 220I, 220Q. For example, the ADC sampling clock may have a frequency equal to the LO frequency fLO divided by a fixed integer (e.g., N).

Figure 3:
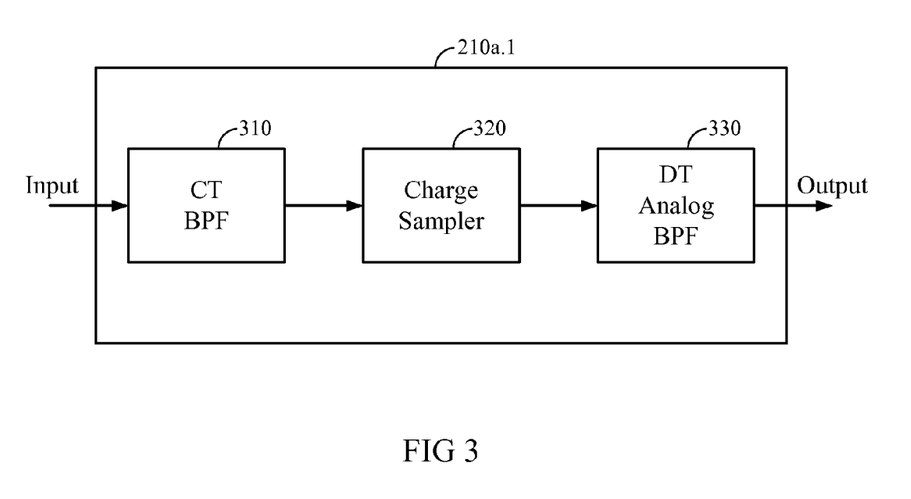
FIG. 3 illustrates an exemplary embodiment of the RX processing block.

FIG. 3 illustrates an exemplary embodiment 210a.1 of the RX processing block 210a. Note FIG. 3 is shown for illustrative purposes only, and is not meant to limit the scope of the present disclosure. Further note that the architecture 210a.1 illustrated in FIG. 3 for the block 210a may also be analogously implemented in block 210b; for ease of illustration, the implementation of block 210b will not be separately described.

In FIG. 3, the input signal to block 210a.1 is coupled to a continuous-time (CT) band-pass filter (BPF) 310. In an exemplary embodiment, the CT BPF 310 may be implemented as, e.g., a first-order high-pass filter (HPF) in series with a first-order low-pass filter (LPF) (not shown). It will be appreciated that the CT BPF 310 may provide interference rejection to the input signal of the RX processing block 210a.1, as well as rejection of image and aliasing frequencies determined by subsequent stages of the RX signal path, e.g., the sampling frequency of the charge sampler, DT analog BPF, or ADC as further described hereinbelow. The output of the CT BPF 310 is coupled to a charge sampler 320. In an exemplary embodiment, the charge sampler 320 further filters the signal by integrating and sampling the signal at fixed intervals. In an exemplary embodiment, the charge sampler 320 may be implemented as described, e.g., according to FIG. 4.

The output of the charge sampler 320 is coupled to a discrete-time (DT) analog band-pass filter (BPF) 330. In an exemplary embodiment, the DT analog BPF 330 may be an FIR filter implemented using, e.g., a switched-capacitor architecture as described with reference to FIG. 5.

Figure 4:
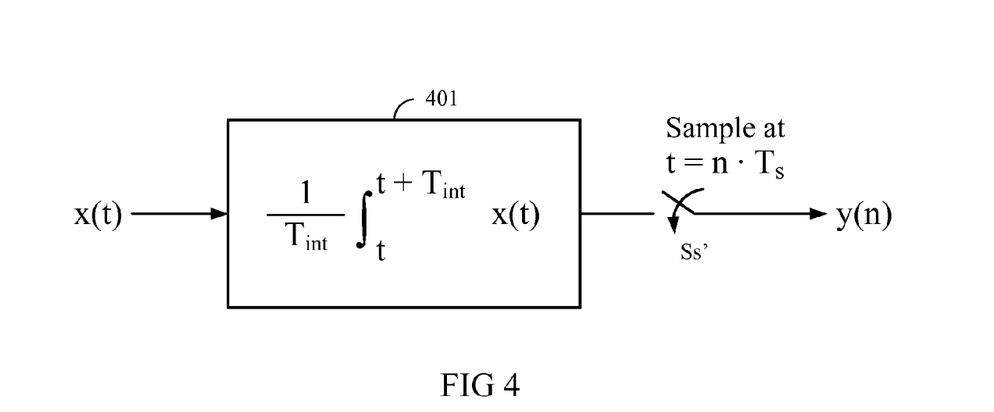
FIG. 4 illustrates an exemplary block diagram showing an exemplary functional operation performed by the charge sampler.

FIG. 4 illustrates an exemplary block diagram showing an exemplary functional operation performed by the charge sampler 320. In FIG. 4, an input voltage x(t) is provided to a functional block 401, which performs the operation shown. In particular, the voltage x(t) is integrated from time t to t+Tint and normalized by a factor (1/Tint), wherein Tint corresponds to an integration duration. The output of block 401 is periodically sampled by a switch Ss' according to a charge sampler sampling interval Ts.

Figure 4A:
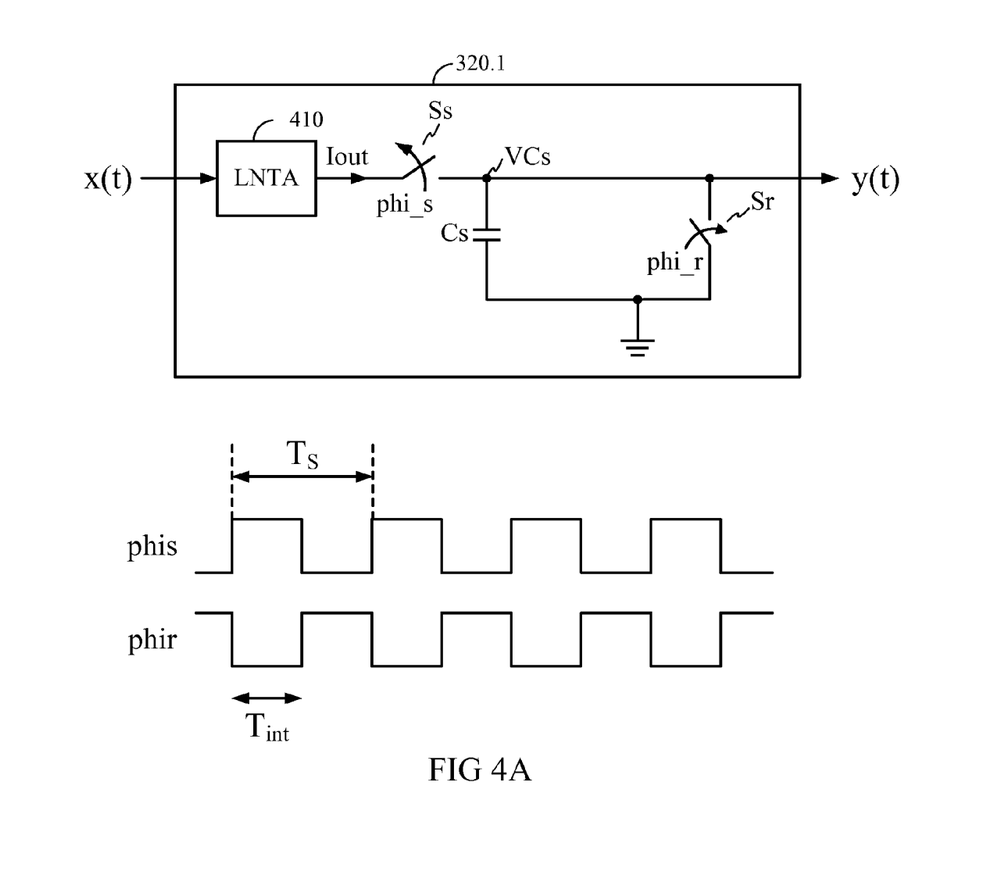
FIG. 4A illustrates an exemplary embodiment of a charge sampler according to the present disclosure.

FIG. 4A illustrates an exemplary embodiment 320.1 of a charge sampler 320 according to the present disclosure. Note FIG. 4A is shown for illustrative purposes only, and is not meant to limit the scope of the present disclosure to any particular exemplary embodiment of a charge sampler. In FIG. 4A, the charge sampler functions to convert an input voltage to current, and further to integrate the converted current as charge onto a capacitor, whose voltage is sampled periodically at a fixed interval.

In particular, a low-noise trans-conductance amplifier (LNTA) 410 receives an input voltage x(t) to the charge sampler 320.1. The LNTA 410 converts the input voltage to an output current Iout, using circuit design principles known to one of ordinary skill in the art. A switch Ss is opened or closed according to a clock phi_s, to selectively decouple or couple Iout to the sampling capacitor Cs. A switch Sr is further opened or closed according to a clock phi_r, to selectively decouple or couple the opposing terminals of Cs from or to each other. As further shown in FIG. 4A, clocks phis and phir may be designed to have non-overlapping phases, e.g., when phi_s is high then phi_r is low, and when phi_r is low then phi_s is high, etc. In an exemplary embodiment, the switches Ss and Sr are never closed at the same time.

Note during time intervals (e.g., having duration Tint) wherein Ss is closed and Sr is open, Iout charges Cs. Accordingly, the voltage VCs across capacitor Cs would be proportional to the integral of Iout during such time intervals. On the other hand, during time intervals wherein Ss is open and Sr is closed, VCs is reset to 0 V. Per the operation of the circuitry 320.1 described hereinabove, it will be appreciated that the charge sampler 320.1 effectively performs the charge sampling operation on the input voltage x(t) as described with reference to FIG. 4.

Figure 4B:
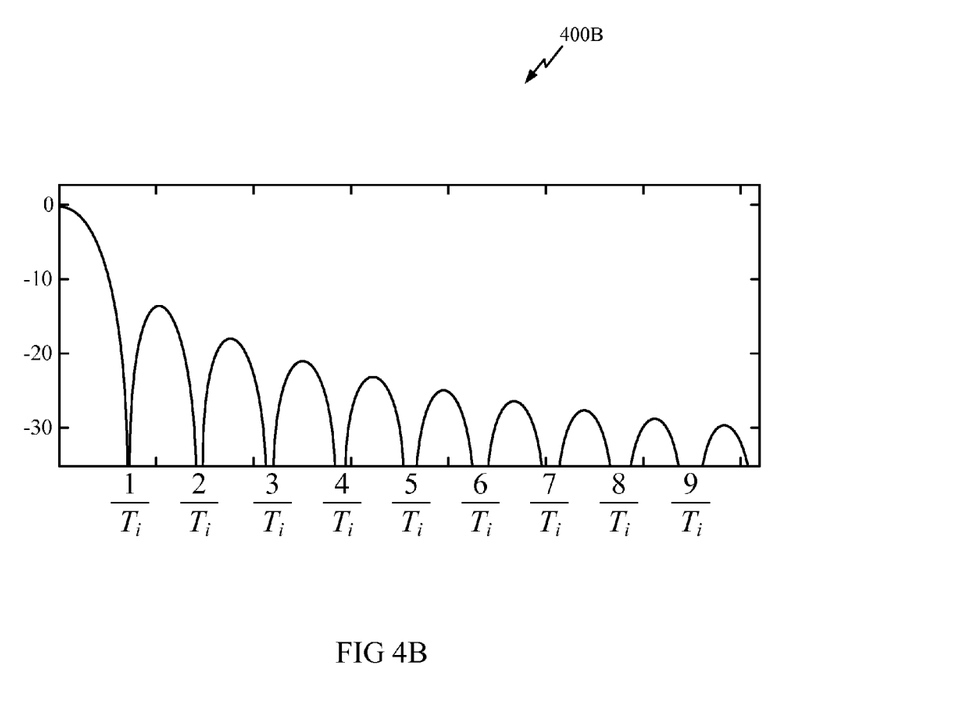
FIG. 4B illustrates an exemplary transfer characteristic of the charge sampler.

It will be appreciated that the transfer characteristic of the charge sampling operation depicted in FIGS. 4 and 4A corresponds to that illustrated in the plot 400B of FIG. 4B. In particular, the transfer characteristic of the charge sampler 320 may be expressed as follows (Equation 1):

$$|H(f)| = \frac{Gm \sin(\pi f T_i)}{2 C_s \pi f};$$

wherein Gm corresponds to the transconductance of the LNTA 410. It will be seen from Equation 1, and from plot 400B, that "nulls" are present in the frequency transfer characteristic at integer multiples of frequency 1/Ti. It will be appreciated that these nulls correspond to frequencies wherein an input signal x(t) to the charge sampling operation would be heavily attenuated. Thus a designer may selectively place these nulls at frequencies in the spectrum known to contain interference, e.g., image or aliasing frequencies of the system.

Figure 5:
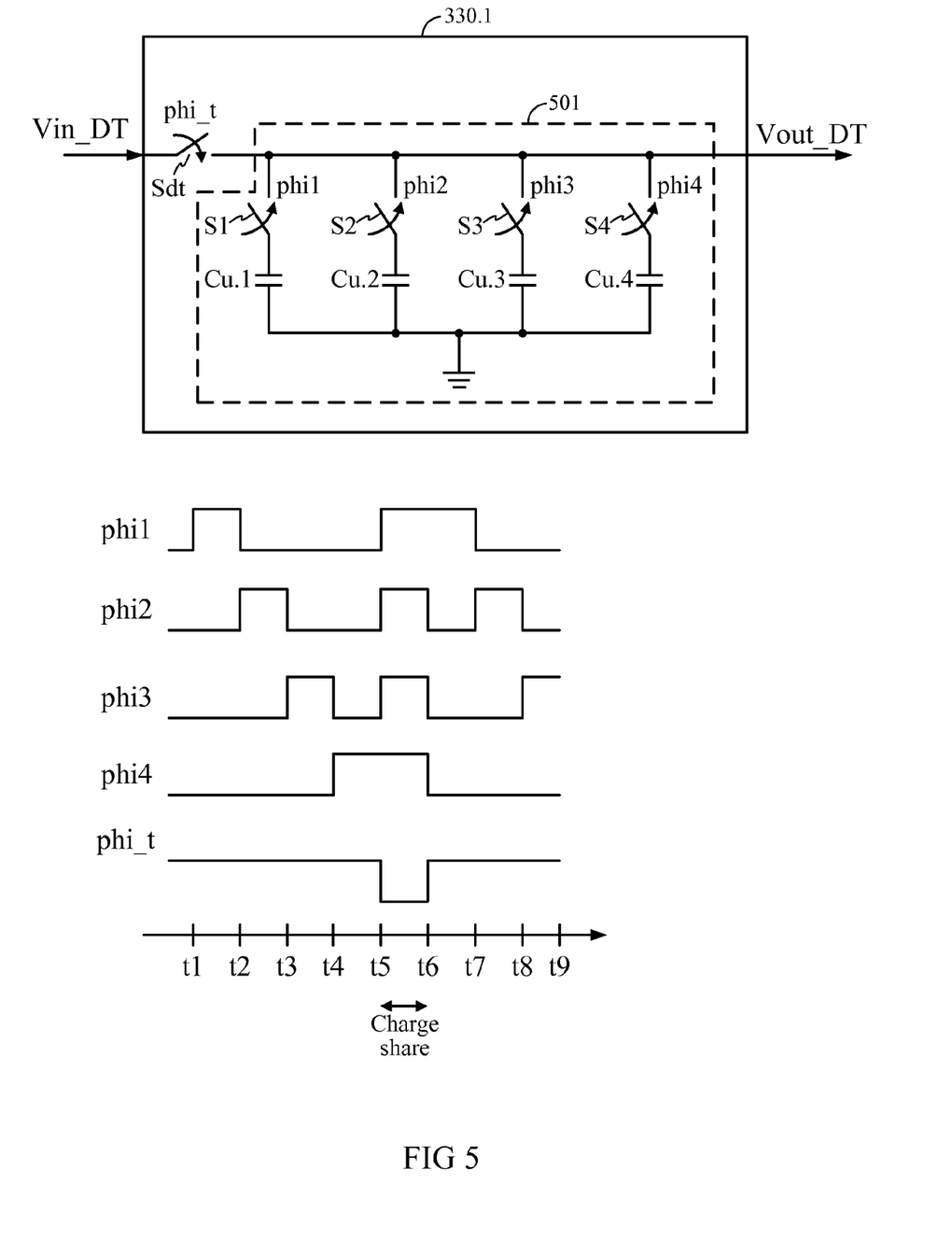
FIG. 5 illustrates an exemplary embodiment of a DT analog BPF.

FIG. 5 illustrates an exemplary embodiment 330.1 of a DT analog BPF 330. Note FIG. 5 is shown for illustrative purposes only, and is not meant to limit the scope of the present disclosure to any particular implementation of a discrete-time analog band-pass filter. Further note that while four capacitors are shown in FIG. 5, it will be appreciated that alternative exemplary embodiments may readily incorporate fewer or more than four capacitors and switches, and such alternative exemplary embodiments are contemplated to be within the scope of the present disclosure.

In FIG. 5, a DT input voltage Vin_DT is coupled to a discrete-time switched-capacitor circuit 501 via a discrete-time switch Sdt, controlled by a clock phi_t. The switched-capacitor circuit 501 includes a plurality of capacitors Cu.1, Cu.2, Cu.3, and Cu.4 coupled to the switch Sdt via respective series-coupled capacitor-switches S1, S2, S3, and S4. The switches S1, S2, S3, and S4 are opened and closed according to clock signals phi1, phi2, phi3, and phi4, respectively. Note according to the convention adopted in FIG. 5, a high value for any clock signal may close the corresponding switch.

As further illustrated in FIG. 5, per the phases of the clock signals, switches S1, S2, S3, and S4 are each closed in succession over a cycle from t1 to t6, and Sdt is closed from t1 to t5 to couple Vin_DT onto the respective capacitors. For example, S1 is closed from t1 to t2, S2 is closed from t2 to t3, S3 is closed from t3 to t4, and S4 is closed from t4 to t5. The successive closing of the switches effectively samples Vin_DT onto the four capacitors Cu.1, Cu.2, Cu.3, and Cu.4 over four successive time intervals during each cycle.

At t5, the input switch Sdt is opened, and all four switches S1, S2, S3, S4 are simultaneously closed from t5 to t6. During this interval, the charges across the capacitors Cu.1, Cu.2, Cu.3, Cu.4 are shared, and the net voltage Vout_DT across each capacitor will be the average of the four sampled voltages. In light of the preceding description, it will be appreciated that the DT analog BPF effectively implements a finite-impulse response (FIR) filter having the following impulse response (Equation 2):

$$h(n)=0.25*[1\ 1\ 1\ 1];$$

with the following transfer characteristic in the z-domain (Equation 3):

$$H(z)=0.25*(1+Z^{-1}+Z^{-2}+Z^{-3}).$$

In an exemplary embodiment, the frequency of the clock signals (e.g., phi1, phi2, phi3, phi4, phi_t) of the DT analog BPF may correspond to the local oscillator frequency fLO, or a divided version thereof. In an exemplary embodiment, the VCO frequency may be chosen as 2× or 4× the LO frequency, in which case a multi-phase LO such as may be needed to drive the clocks phi1, phi2, phi3, phi4 may be readily generated.

It will be appreciated that providing discrete-time components such as the charge sampler and discrete-time analog BPF described hereinabove advantageously allow the frequency response of the filtering elements to be readily re-programmable depending on the specific IF. In contrast, it would be relatively difficult to re-program the frequency response of one or more continuous-time filters to accommodate a sliding IF. For example, in certain applications, the IF may range from as high as 400 MHz to as much as a decade lower than 400 MHz, which would make the design of a continuous-time low-pass filter to reject aliasing components extremely difficult. On the other hand, when using a discrete-time analog BPF, the notch frequencies of such a DT analog BPF may be readily programmed according to the variable IF to address the anticipated aliasing frequencies.

A further advantage of using a switched-capacitor architecture such as that shown in FIG. 5 for the DT analog BPF is that, since passive components such as capacitors are primarily used, power consumption of the filter is kept at a minimum.

Further advantages of the DT analog BPF architecture 330.1 described with reference to FIG. 5 include the capability to easily adjust the coefficient values (e.g., of the coefficients of the impulse response in Equation 2) by changing the capacitor size. Additionally, the input sampling network of an ADC may be utilized for the filtering purposes as well.

Note while an exemplary embodiment of a discrete-time analog bandpass filter has been described with reference to FIG. 5, the scope of the present disclosure is not necessarily limited to such implementations of a discrete-time analog bandpass filter. In alternative exemplary embodiments, alternative architectures for a discrete-time analog BPF may readily be designed by one of ordinary skill in the art in light of the principles described hereinabove. Such alternative exemplary embodiments are contemplated to be within the scope of the present disclosure.

Furthermore, in alternative exemplary embodiments (not shown), the DT analog BPF may be implemented as a complex FIR filter, e.g., wherein the outputs of the BPF's are averaged across the I and Q paths. For example, in an exemplary embodiment, a complex FIR filter with the following impulse response may be implemented (Equation 5):

$$h(n)=0.25*[1,+j,-1,-j].$$

Such a complex FIR filter may advantageously provide better jammer rejection using a lower filter order.

Figure 6:
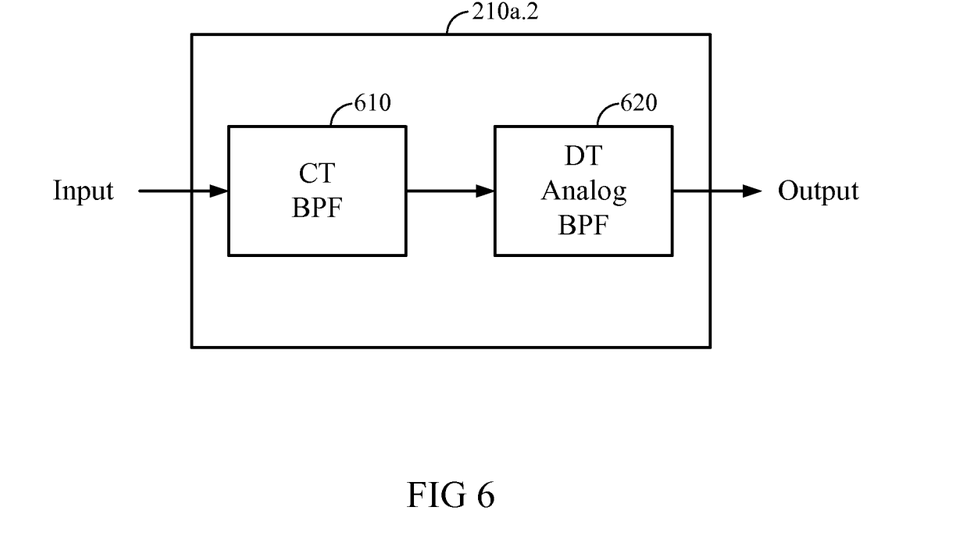
FIG. 6 illustrates an alternative exemplary embodiment of an RX processing block according to the present disclosure.

FIG. 6 illustrates an alternative exemplary embodiment 210*a*.2 of an RX processing block 210*a* according to the present disclosure. In FIG. 6, a CT BPF 610 is coupled to a DT analog BPF 620, which is further coupled to a down-sampler 630. Compared to the exemplary embodiment 210*a*.1 of FIG. 3, the RX processing block 210*a*.2 omits the charge sampler 320. It will be appreciated that in certain exemplary embodiments of the present disclosure, the filtering characteristics of a charge sampler are not necessary to meet the transceiver specifications, and thus the charge sampler may be omitted as shown. Note the operation of the CT BPF 610 and DT analog BPF 620 may be similar to analogous blocks previously described with reference to 210*a*.1. Further note that the architecture 210*a*.2 illustrated in FIG. 6 for the block 210*a* may also be analogously implemented in block 210*b*; for ease of illustration, the implementation of block 210*b* will not be separately described.

As earlier described hereinabove, in an exemplary embodiment, a single phase-locked loop (PLL) may be used to generate both RX and TX LO signals. Furthermore, the same PLL may be used to generate all clocks required in the transceiver, e.g., using a divider with an integer divide ratio. For example, the charge sampler, the discrete-time analog bandpass filter, the ADC, etc., may all use clock signals derived from the PLL, either directly, or following division by an integer divider. Such alternative exemplary embodiments are contemplated to be within the scope of the present disclosure.

Figure 7:
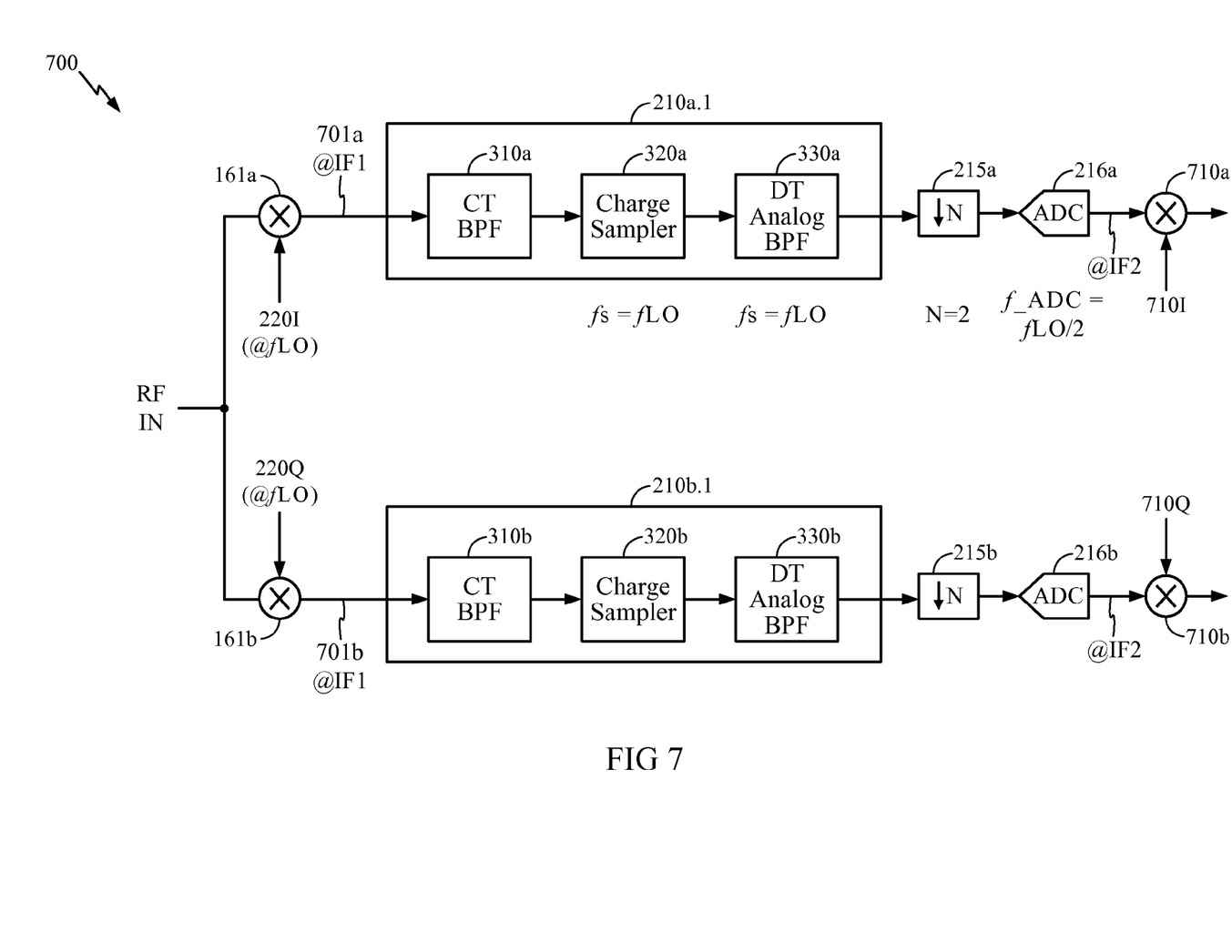
FIG. 7 illustrates an exemplary embodiment of RX processing blocks, with exemplary performance specifications.

FIG. 7 illustrates an exemplary embodiment 700 of RX processing blocks 210*a*.1 and 210*b*.1, with exemplary performance specifications. Note the exemplary specifications described with reference to FIG. 7 are for illustrative purposes only, and are not meant to limit the scope of the present disclosure. The exemplary specifications are described for an illustrative scenario wherein the TX carrier frequency is in the range 704-716 MHz, and the RX carrier frequency is in the range 734-746 MHz. In this case, the duplexer spacing may be chosen as 30 MHz to separate the TX and RX frequencies. The scenario may be present in, e.g., wireless systems implemented according to the LTE standard.

In FIG. 7, mixers 161*a*, 161*b* mix the RF IN signal (or RX signal) with quadrature LO's 220I, 220Q, respectively. The LO's in this case have a frequency fLO, corresponding to the same frequency used for up-conversion of the TX signal by the TX signal path (not shown in FIG. 7). In an exemplary embodiment, fLO may be 710 MHz, corresponding to the TX carrier frequency. As the RX and TX carrier frequencies may differ in this system by 30 MHz (also corresponding to the duplexer frequency), it will be appreciated that the down-converted outputs 701a, 701b of mixers 161a, 161b will be centered at a first intermediate frequency (IF1) of 30 MHz.

Signals 701a, 701b are processed by RX processing blocks 210a.1, 210b.1, respectively. Each of blocks 210a.1, 210b.1 include a CT BPF, charge sampler, DT analog BPF, and down-sampling block, e.g., as previously described hereinabove with reference to FIG. 3. In an exemplary embodiment, each of the CT BPF's 310a, 310b are implemented as a serial concatenation of a first-order high-pass filter (HPF) and a first-order low-pass filter (LPF). In an exemplary embodiment, the sampling frequency fs of the charge sampler (e.g., Ts in FIGS. 4 and 4A) may be chosen to be the same frequency fLO used for down-conversion. Furthermore, the charge samplers 320a, 320b may be configured to sample the outputs of CT BPF's 310a, 310b at a 75% duty cycle for jammer filtering, e.g., Tint/Ts=75%.

In an exemplary embodiment, each of the charge samplers 320a, 320b may be implemented as described with reference to the charge sampler 320.1 in FIG. 4. For example, phi_s may be a clock signal that configures Ss to be closed 75% of each cycle, and phi_r may accordingly configure Sr to be closed the remaining 25% of each cycle. Note in certain exemplary embodiments, the charge samplers 320a, 320b may be omitted, and the first-order LPF of the CT BPF's 310a, 310b may be relied upon for jammer filtering.

The DT analog BPF's 330a, 330b are configured to filter the outputs of the charge samplers 320a, 320b with a discrete-time sampling frequency fs that may correspond to the same frequency fLO used for downconversion. The DT analog BPF's 330a, 330b may be designed to reject components at the aliasing frequencies determined by the subsequent decimation and ADC sampling blocks. Following BPF's 330a, 330b, the down-sampling blocks 215a, 215b down-sample the resultant signal by a factor of N=2, before digitizing the outputs using ADC's 216a, 216b. In an exemplary embodiment, the sampling frequency f_ADC of the ADC's 216a, 216b may be chosen as fLO/2, e.g., 355 MHz. It will be appreciated that ADC's with sampling frequency in this range may be readily designed with low cost and implementation complexity. Following digitization by ADC's 216a, 216b, digital mixers 710a, 710b are provided to digitally down-convert the ADC outputs to baseband using, e.g., digital LO's 710I, 710Q.

Figure 8:
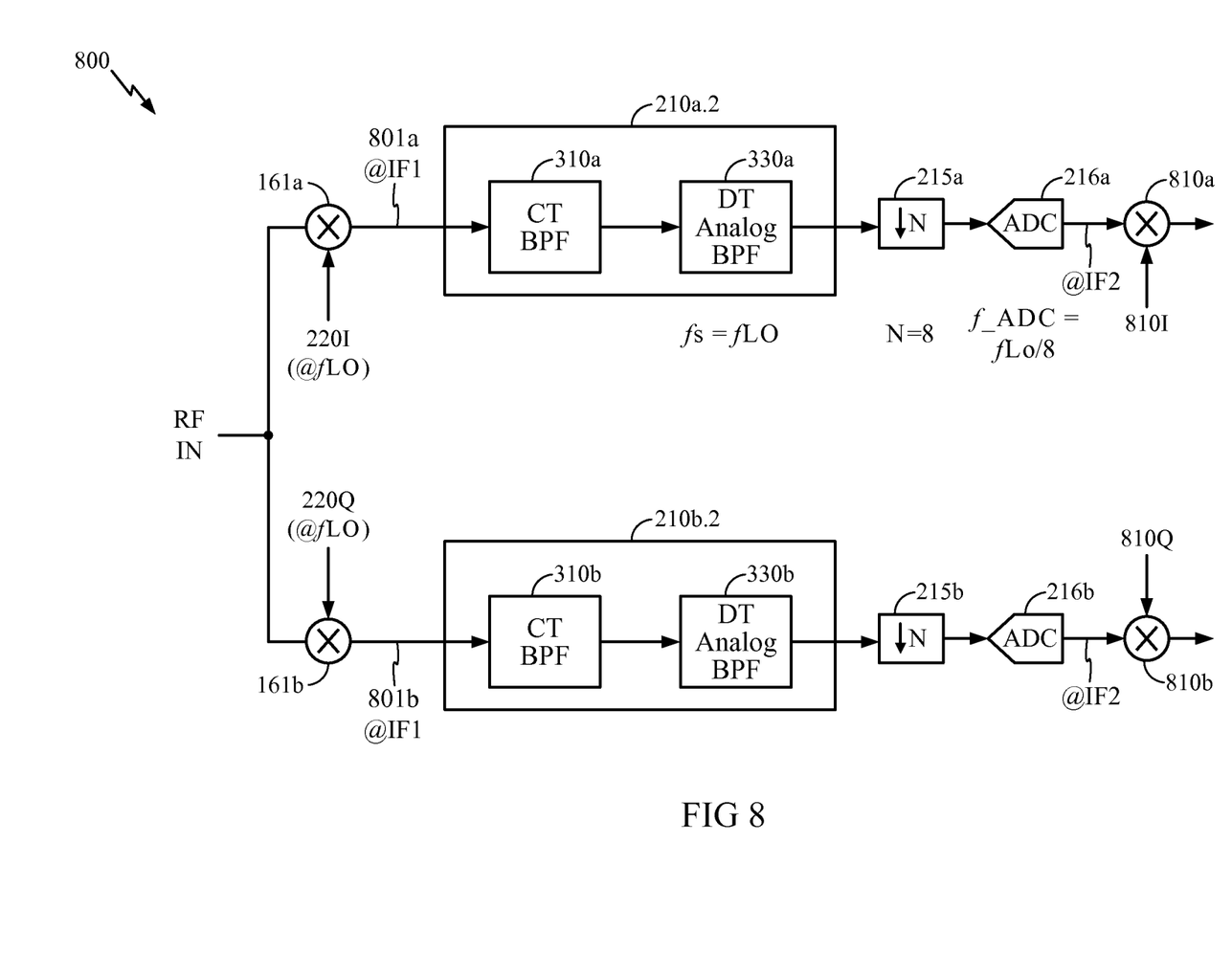
FIG. 8 illustrates an alternative exemplary embodiment of a receive signal path using RX processing blocks, with exemplary performance specifications.

FIG. 8 illustrates an alternative exemplary embodiment 800 of a receive signal path using RX processing blocks 210a.2 and 210b.2, with exemplary performance specifications. Note the exemplary specifications described with reference to FIG. 8 are for illustrative purposes only, and are not meant to limit the scope of the present disclosure. The exemplary specifications are described for an illustrative scenario wherein the TX carrier frequency is in the range 1920-1980 MHz, and the RX carrier frequency is in the range 2110-2170 MHz. In this case, the duplexer spacing may be chosen as 190 MHz. The scenario may be present in, e.g., wireless systems implemented according to the WCDMA, CDMA, and/or LTE standard.

In FIG. 8, mixers 161a, 161b mix the RF IN signal with quadrature LO's 220I, 220Q, respectively. In an exemplary embodiment, the LO's 220I, 220Q have a frequency fLO of 1950 MHz, which is also the frequency used for up-conversion of the TX signal by the TX signal path (not shown in FIG. 8). As the RX and TX carrier frequencies may differ in this system by 190 MHz, it will be appreciated that the down-converted outputs 801a, 801b of mixers 161a, 161b will be centered at an IF1 of 190 MHz.

Signals 801a, 801b are processed by TX processing blocks 210a.2, 210b.2, respectively. Each of blocks 210a.2, 210b.2 include a CT BPF, DT analog BPF, and down-sampling block, e.g., as previously described hereinabove with reference to FIG. 6. In an exemplary embodiment, each of the CT BPF's 310a, 310b are implemented as a serial concatenation of a first-order high-pass filter (HPF) and a second-order low-pass filter (LPF). Note in the exemplary embodiment shown, no charge samplers are needed as the CT BPF, in particular the CT LPF, may be sufficient for jammer rejection.

The DT analog BPF's 330a, 330b are configured to filter the outputs of the CT BPF's 310a, 310b with a discrete-time sampling frequency that corresponds to the same frequency used for downconversion, e.g., fLO=1950 MHz. The down-sampling blocks 340a, 340b subsequently down-sample the resultant signals by a factor of N=8. The output of RX processing blocks 216a, 216b are provided to band-pass ADC's 216a, 216b. In an exemplary embodiment, the sampling frequency f_ADC of the ADC's 216a, 216b may be chosen as fLO/8, e.g., 243.75 MHz, in which case the RX frequency spectrum is centered at a second intermediate frequency IF2=53.75 MHz. Following digitization by ADC's 216a, 216b, digital mixers 810a, 810b are provided to digitally down-convert the ADC outputs to baseband.

Figure 9:
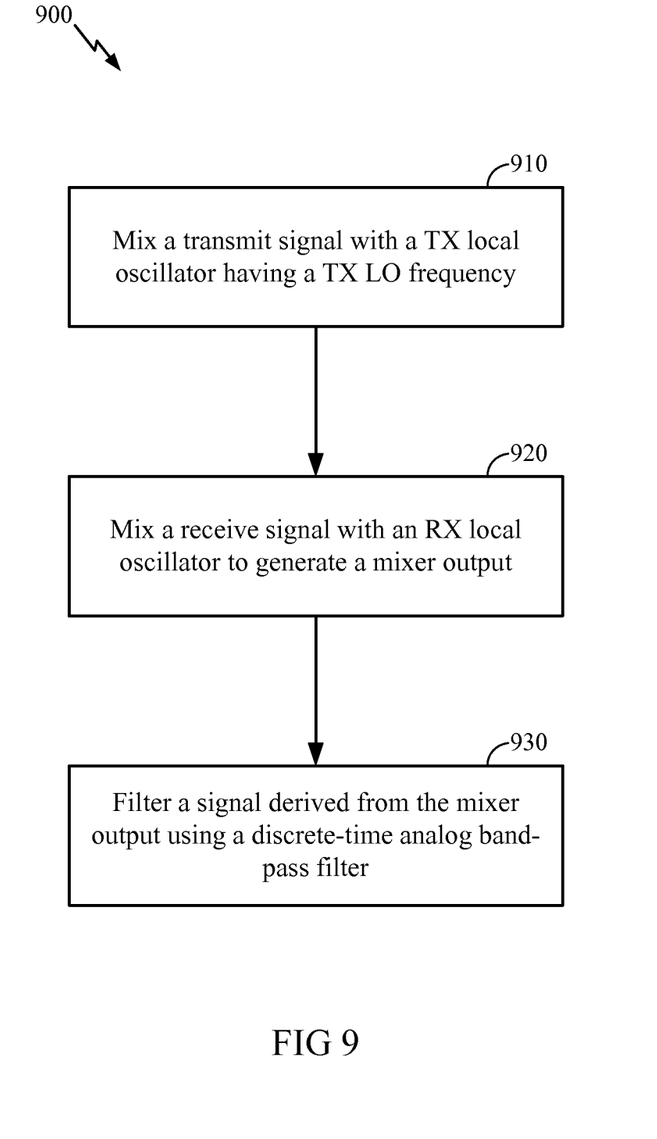
FIG. 9 illustrates an exemplary embodiment of a method according to the present disclosure.

FIG. 9 illustrates an exemplary embodiment of a method 900 according to the present disclosure. Note FIG. 9 is shown for illustrative purposes only, and is not meant to limit the scope of the present disclosure.

In FIG. 9, at block 910, a transmit signal is mixed with a TX local oscillator (LO) having a TX LO frequency.

At block 920, a receive signal is mixed with an RX LO to generate a mixer output.

At block 930, a signal derived from the mixer output is filtered using a discrete-time analog band-pass filter.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present. Furthermore, when an element is referred to as being "electrically coupled" to another element, it denotes that a path of low resistance is present between such elements, while when an element is referred to as being simply "coupled" to another element, there may or may not be a path of low resistance between such elements.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the exemplary aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary aspects of the invention.

The various illustrative logical blocks, modules, and circuits described in connection with the exemplary aspects disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary aspects disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-Ray disc where disks usually reproduce data magnetically, while discs reproduce data optically with lasers. Combinations of the above should also be included within the scope of computer-readable media.

The previous description of the disclosed exemplary aspects is provided to enable any person skilled in the art to make or use the invention. Various modifications to these exemplary aspects will be readily apparent to those skilled in the art, and the generic principles defined herein may be applied to other exemplary aspects without departing from the spirit or scope of the invention. Thus, the present disclosure is not intended to be limited to the exemplary aspects shown herein but is to be accorded the widest scope consistent with the principles and novel features disclosed herein.

The invention claimed is:

1. An apparatus comprising:
 a transmit signal path configured to upconvert a transmit signal using a transmit (TX) local oscillator (LO) having a TX LO frequency;
 a receive signal path configured to downconvert a receive signal using a receive (RX) LO having the TX LO frequency, the receive signal path comprising a discrete-time analog filter configured to process the downconverted receive signal; and
 a continuous-time band-pass filter coupled to the output of a mixer of the receive signal path; and
 the discrete-time analog filter comprising a discrete-time switch selectively coupling a DT input voltage derived from the output of the continuous-time band-pass filter to a subsequent portion of the discrete-time analog filter.

2. The apparatus of claim 1, the discrete-time analog filter comprising a discrete-time analog band-pass filter.

3. The apparatus of claim 1, further comprising a duplexer isolating the transmit signal path and from the receive signal path, the duplexer designed to operate with an RX-to-TX duplexer frequency separation, wherein a passband of the discrete-time analog filter includes the RX-to-TX duplexer frequency separation.

4. The apparatus of claim 1, further comprising a phase-locked loop configured to generate a single LO signal that is used for both the TX and RX local oscillators, wherein the single LO signal is further supplied to the discrete-time analog filter to control one or more switches for sampling an input to the discrete-time analog filter.

5. The apparatus of claim 1, further comprising:
 a charge sampler configured to integrate a signal derived from the output of a mixer of the receive signal path for an integration duration, the charge sampler further configured to sample the output of the integration according to a charge sampler sampling interval.

6. The apparatus of claim 5, the charge sampler comprising:
 a trans-conductance amplifier configured to convert the signal derived from the output of the mixer to a current; and
 a sampling capacitor selectively coupleable to the output of the trans-conductance amplifier, wherein the sampling capacitor is coupled to the output of the transconductance amplifier for a portion of the charge sampler sampling interval, and the sampling capacitor is reset at the end of the portion of the charge sampler sampling interval.

7. The apparatus of claim 1, further comprising:
 a charge sampler configured to integrate a signal derived from the output of a mixer of the receive signal path for an integration duration, the charge sampler further configured to sample the output of the integration according to a charge sampler sampling interval, wherein the signal derived from the mixer is a voltage generated by the continuous-time band-pass filter.

8. The apparatus of claim 1, the subsequent portion of the discrete-time analog filter comprising:
a discrete-time (DT) switched capacitor circuit.

9. The apparatus of claim 8, the discrete-time switched capacitor circuit comprising:
a plurality of capacitors, each capacitor selectively coupled to the discrete-time switch by a corresponding series-coupled capacitor-switch;
wherein the series-coupled capacitor-switches are configured to successively sample the DT input voltage onto the plurality of capacitors, and to share the charge amongst the plurality of capacitors during a predetermined time interval to generate the output of the discrete-time switched capacitor circuit.

10. The apparatus of claim 1, further comprising:
an analog-to-digital converter (ADC) for converting a signal of the receive signal path to a digital signal, the ADC configurable to sample a voltage using an ADC sampling clock derived from the RX LO.

11. The apparatus of claim 10, the receive signal having a carrier frequency, the difference between the carrier frequency and the LO frequency comprising an intermediate frequency.

12. The apparatus of claim 1, the receive signal path comprising an in-phase (I) mixer and a quadrature (Q) mixer, wherein the RX LO comprises an I local oscillator signal and a Q local oscillator signal.

13. An apparatus comprising:
means for mixing a transmit signal with a transmit (TX) local oscillator (LO) having a TX LO frequency;
means for mixing a receive signal with a receive (RX) local oscillator (LO) having the TX LO frequency to generate a mixer output;
means for filtering the mixer output in continuous time; and
means for filtering in discrete time a signal derived from the mixer output, the means for filtering in discrete time comprising a discrete-time switch selectively coupling a DT input voltage derived from the output of the continuous-time band-pass filter to a portion of the discrete-time analog filter, the signal derived from the mixer output comprising the output of the means for filtering the mixer output in continuous time.

14. The apparatus of claim 13, further comprising:
means for integrating a second signal derived from the mixer output; and
means for sampling the output of the means for integrating according to a charge sampler interval, the signal derived from the mixer output comprising the output of the means for sampling.

15. The apparatus of claim 13, further comprising:
means for sub-sampling the output of the means for filtering in discrete time; and
means for digitizing the output of the means for sub-sampling.

16. A method comprising:
mixing a transmit signal with a transmit (TX) local oscillator (LO) having a TX LO frequency;
mixing a receive signal with a receive (RX) local oscillator (LO) having the TX LO frequency to generate a mixer output;
filtering the mixer output using a continuous-time band-pass filter;
selectively coupling a DT input voltage derived from the output of the continuous-time band-pass filter to a discrete-time analog band-pass filter using a discrete-time switch; and
filtering the DT input voltage using the discrete-time analog band-pass filter.

17. The method of claim 16, the filtering the signal comprising placing a notch of the discrete-time analog band-pass filter at a frequency corresponding to an interferer.

\* \* \* \* \*